July 20, 1926.                                                         1,592,832
                              M. LA LONDE
                        FIFTH WHEEL CONSTRUCTION
                     Filed March 10, 1925    2 Sheets-Sheet 1

INVENTOR.
Moses La Londe.
BY
Harry W. Bown.
ATTORNEY.

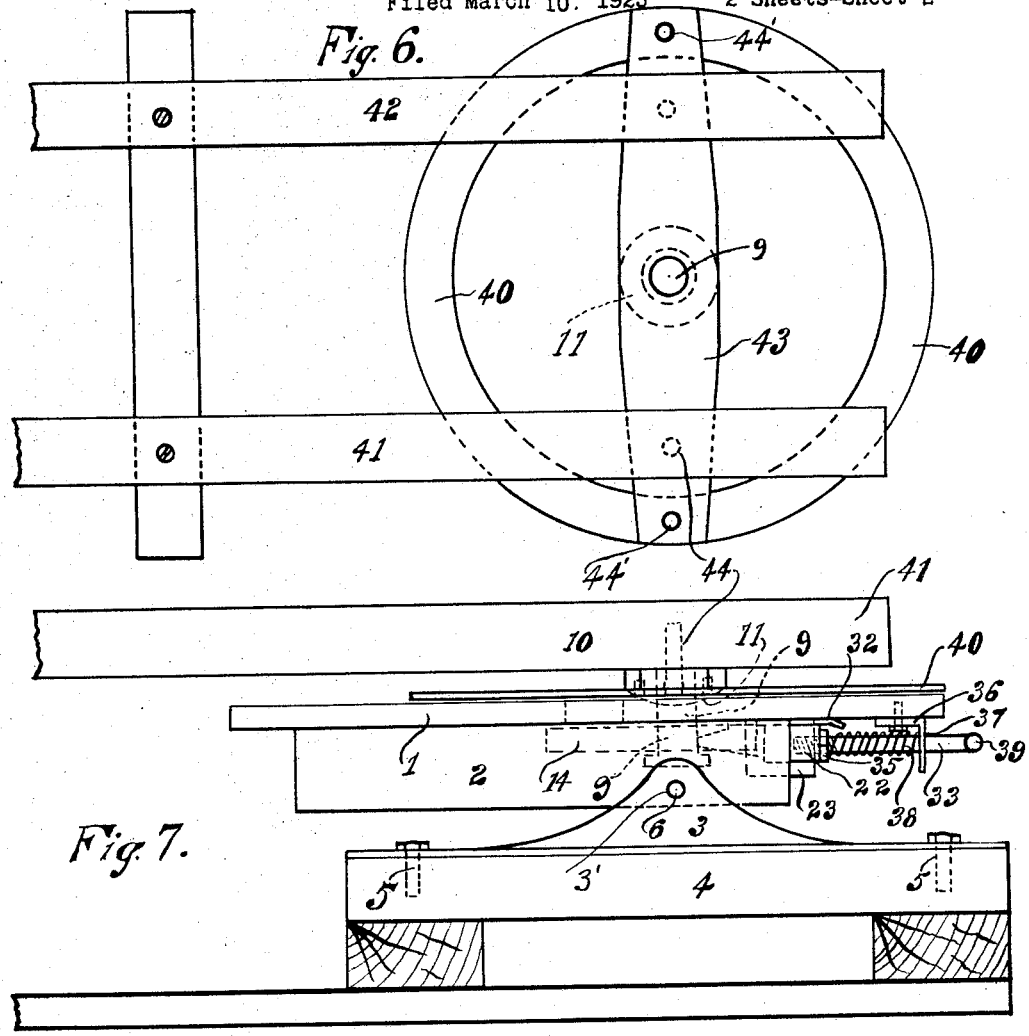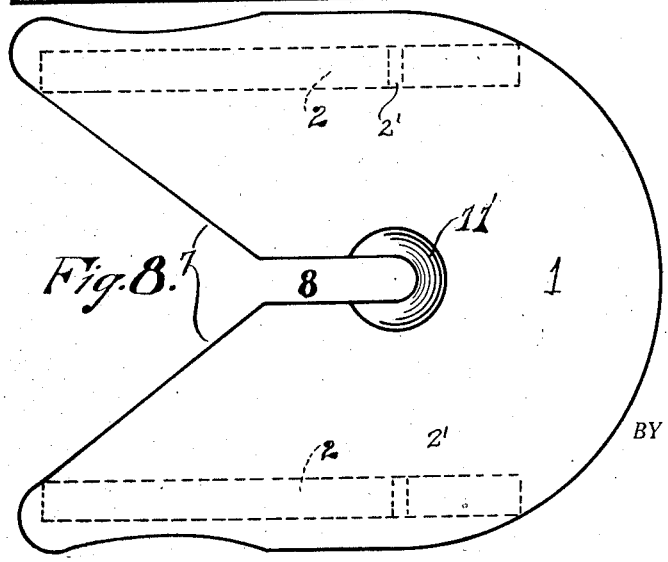

Patented July 20, 1926.

1,592,832

UNITED STATES PATENT OFFICE.

MOSES LA LONDE, OF SPRINGFIELD, MASSACHUSETTS, ASSIGNOR OF ONE-HALF TO HARLEY O. PLAUS, OF WEST SPRINGFIELD, MASSACHUSETTS.

FIFTH-WHEEL CONSTRUCTION.

Application filed March 10, 1925. Serial No. 14,409.

This invention relates to improvements in what is known as fifth wheel constructions.

An object of the invention is to provide means for automatically coupling the trailer to the tractor part of a motor vehicle. Heretofore it has been a common practice to release the trailer by the attendant leaving his place on the tractor while the locking device is held in an unlocking position. In the present invention the locking latch which couples the trailer to the tractor is withdrawn and then when the attendant returns to his place on the tractor and starts the tractor forward, the trailer is automatically released. This construction avoids the necessity of a second attendant to carry out the coupling and uncoupling operation.

Broadly it comprises a tiltable plate member which is suitably supported by brackets on the trailer. This plate member is formed with a throat portion to receive the connecting pin which is secured to the front end of the trailer in the usual manner. A locking latch which is operated by the pin is automatically moved by means of a rotatable pin locking plate and means are provided for automatically moving the locking latch by the pin locking plate when the trailer or tractor is moved away.

Referring to the drawings:

Fig. 6 is a plan view of the metal ring or circle which is carried by the trailer and rests on the tiltable plate.

Fig. 7 is a side elevational view showing the parts assembled with the locking pin in engagement with its locking plate, and Fig. 8 is a top plan view of the plate carried by the tractor.

Figure 1:
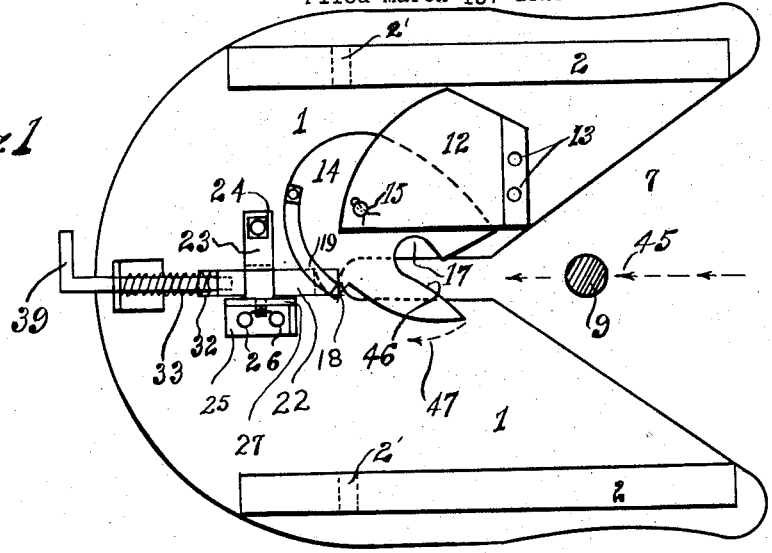
Fig. 1 is a bottom plan view of the tiltable plate which is carried by the tractor and showing the pin locking plate, the slidable latch for retaining this plate in a pin locking position and illustrating the pin in the act of entering the throat portion of the tiltable plate.

Referring to the drawings in detail:

1 designates the tiltable table or plate member having formed near the opposite side edges thereof, the integral supporting brackets 2. 3 are brackets supported on the frame work 4 of the tractor. The brackets 3 are secured to the frame work 4 by means of the machine screws 5. 6 is a transversely located pivot pin which extends through openings 2' and 3' in the two sets of brackets 2 and 3, whereby the plate 1 is tiltably and pivotally supported. 7 is a V-shaped cut out or throat portion 8 for receiving the pin 9 which is carried by the trailer. This pin is secured to the trailer frame work 10 in any suitable way as by riveting the same in the metallic cross bar 43. 11 designates the curved shaped bearing part which surrounds the pin 9 and which part rests in the concave shaped surface 11' on the upper surface of plate 1, see Fig. 8. Located on the under side of the plate 1 is the plate 12 which is secured to this plate by means of the screws 13, or, if desired, it may be formed integral therewith. This plate 12 is spaced from the under side of the plate 1 for the purpose of affording sufficient space for receiving the pin locking plate or member 14 which is pivotally secured in place by means of a pin 15 which passes through the plates 12 and 1, and, through the opening 16 in the pin locking member 14. This locking member is formed with the recessed portion 17 and the two shoulder portions 18 and 19. Secured to the plate 14 is a fingerlike member 20 having the upwardly curved end portion 21. It will be noticed that its upwardly curved end portion terminates a short distance from the shoulder portion 18. 22 is a slidable latch which passes through an opening in the member 23. The member 23 is suitably secured to the plate 1 by means of the screws 24, or, if desired, this member 23 may be cast integral with the plate 1. 25 is a right angle shaped member which is secured to the plate 1 by means of the screws 26. The up-right web portion 27 of the member 25 forms a surface against which the latch 22 rests and slides, or, in other words, the latch 22 is confined between the member 23 and the part 27. The latch 22 is formed with an upper flat surface 28, a vertical shoulder portion 29, and an inclined or wedge shaped surface 30. 31 is a vertical shoulder portion which is located underneath the forward end of the wedge shaped part 30. 32 is flat spring which is attached to the upper side of the latch 22 and is located in a notch or cut out part of the latch, on its upper side as shown. Secured to the latch 22 is a bolt 33 that is threaded into the latch at its inner end as indicated at 34. 35 is a lock nut for retaining the rod 33 attached thereto. 36 is a right angular shaped piece that is secured to the plate 1 and formed with an upwardly extending plate portion 37. Located between this portion and the nut 35 is a coiled expansion spring 38 which spring normally forces the latch 22 forward. The bolt 33 is formed with a handle portion 39. 40 designates a ring or plate member which is secured to the forward end of the trailer as indicated by the members 41 and 42. 43 is a transversely located cross bar which is attached to the ring 40 as indicated by the rivets at 44'. This cross bar carries the pin 9, as already described.

The operation of my improvement may be explained as follows: Assuming that the pin locking plate 14 is in the position shown in Fig. 1 and that the pin 9 is about to enter the narrow throat portion 8. The pin 9, being on the trailer, is in a stationary position. The tractor may be assumed as moving rearward towards the pin 9, or, the pin 9 moved forward toward the tractor as indicated by the arrows 45. The pin 9 will engage the surface 46 of the plate 14 causing it to rotate about its pin 15 in the direction of the arrow 47. This operation will move the plate 14 into the position shown in Fig. 2 with the result that the pin 9 is now within the throat 8 and is connected or locked to the plate 1. At the same time that the pin locking plate 14 is turned or moved rearward the surface 31 of the latch 22 is engaged by the curved outer edge 48. This will move the latch rearward against the tension of the spring 38 until the latch engages the shoulder portion 29 when said latch is automatically moved downwards by the spring 32 on its upper side. The vertical side, that is to say the side opposite that shown in Fig. 5 of the latch 22 will now be in contact with the shoulder portion 18 of the locking plate 14, see Fig. 2. In order to release the pin 9 the operator pulls outwardly on the bolt 33 against the tension of the spring 38. The spring 32 will move the latch 22 downward when the surface 28 moves outward from its normal position under the part 23. The surface 29 is then located against the edge 49 of the part 23. This operation frees the plate 14 so that it may be moved into the position shown in Fig. 1 by the operation of the pin 9 engaging the surface 50. As the plate 14 is rotated about its pin 15 in returning to its original position the finger portion 20 will then ride on the inclined surface 30 of the latch. This will move the latch 22 downward and free the surface 29 from the edge 49 permitting the latch to move forward again by the action of the spring 38 and snap into the position shown in Fig. 1, which position is immediately in front of the shoulder portion 19, see Fig. 3, thus preventing the pin locking plate 14 from being moved beyond the position shown in Fig. 1, or in other words it is reset for a second operation of locking the pin 9 to the plate 1.

Figure 2:
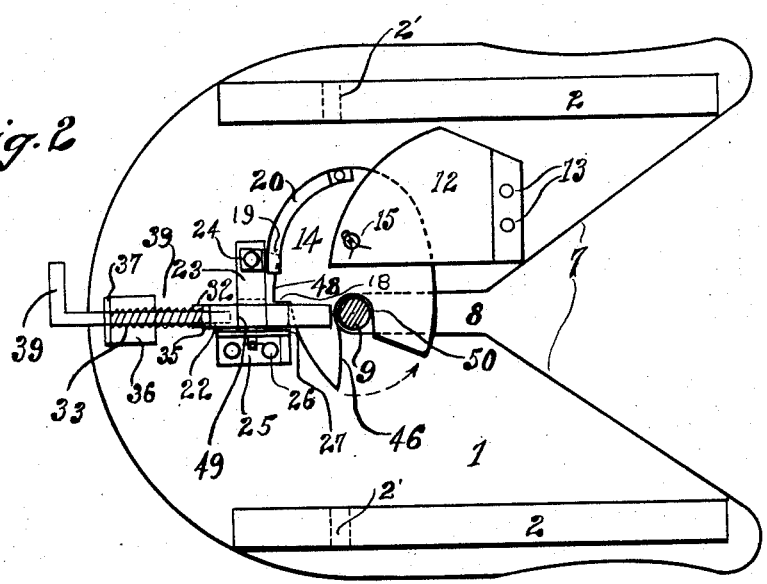
Fig. 2 is a bottom plan view corresponding with Fig. 1 but illustrating the position of the parts after the trailer pin has entered the throat portion and rotated the pin locking plate.
Figures 3, 5:
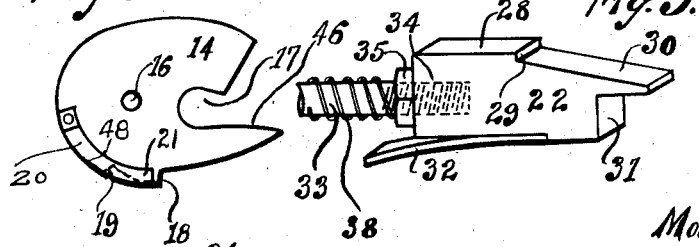
Fig. 3 is a detail plan view of the pin locking plate.
Fig. 5 is a perspective view of the locking latch which cooperates with the pin locking plate.
Figure 4:
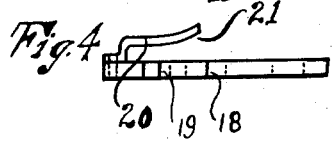
Fig. 4 is an edge view of Fig. 3.

It will thus be seen from this description that the plate 14 when in the position shown in Fig. 1 is set for a second locking operation and in the position shown in Fig. 2 is in a locked position and that a single element, the latch 22, performs both operations.

What I claim is:

1. In a device for the purpose described, in combination a tiltable plate formed with a recessed edge portion and a throat portion communicating therewith, a pin locking plate having a recessed portion and pivotally attached to the said plate, a pin for moving the pin locking plate from one position to another to bring the recessed part of the plate into alignment with the throat portion of the tiltable plate, and means comprising a slidable bolt having a plurality of shoulders and an inclined surface for locking and releasing the pin locking plate against movement when in said pin locking position to prevent the pin from being removed and means on the plate cooperating with the inclined surface of the bolt for freeing the said bolt to permit the pin to operate the said plate whereby the pin may be freed from its locked position.

2. In a device for the purpose described, in combination, a tiltable plate formed with a recessed edge portion and a throat portion, a pin locking plate having a recessed portion and pivotally attached to said plate, the pin operating to move the pin locking plate from one position to another to bring the recessed part of the pin locking plate into alignment with the throat portion of the tiltable plate, and means comprising a spring actuated bolt for locking the pin locking plate against movement when in this position, means comprising a finger-like part on the pin locking plate cooperating with the locking means to free the locking means from the pin locking plate to automatically permit this plate to move into an unlocking position of the pin and the recessed portion of the pin locking plate out of registration with the throat portion of the tiltable plate.

3. A fifth wheel construction comprising in combination, a supporting plate, means for tiltably supporting the plate, the plate having converging side edges terminating in a throat portion, a pin locking plate pivotally connected to said plate and formed with a recessed entrance edge against which the pin that is to be locked to the plate engages for rotating the locking plate, a locking latch formed with two vertical shoulders, one shoulder being for retaining the latch in a rearward inoperative position to permit the locking plate to move into an unlocking position and the other shoulder cooperating with the locking plate for moving the latch into its inoperative position, said locking plate having two shoulder portions with which the latch cooperates to limit the outward movement of the locking plate and to retain the same in a locking position when the pin engages said edge.

4. In a fifth wheel construction, in combination, a supporting plate, a pin locking member pivotally connected to the supporting plate and formed with a recessed portion and a plurality of shoulder portions, a locking latch for the said member designed to engage the shoulder portions for retaining the pin locking member in fixed positions, said latch having a surface against which the edge of the said locking member engages when it is moved by the pin into its pin locking position to permit the latch to engage one of the shoulder portions for retaining the locking latch in its pin locking position, means on the pin locking plate to engage and move said latch to permit the latch to move forward and engage the other shoulder portion of the pin locking member, means for moving the latch upwardly and other means for moving the latch forwardly, the construction and arrangement being such that the latch performs the dual function of retaining the pin locking plate in its pin locking position and for preventing the pin locking plate to move beyond a predetermined position.

5. In a fifth wheel construction, in combination with a plate member which is formed with converging edges that terminate and merge into a throat portion for receiving the pivot pin of a trailer, means for locking the pin in the throat portion comprising a rotatable plate having a recessed portion to receive the pin and an edge portion against which the pin strikes for rotating the plate into the position for locking it in the said throat portion, a latch, a shoulder portion on the locking plate with which the latch engages when the recessed part of the rotatable pin locking plate coincides with the throat portion, said latch having a shoulder portion for retaining the latch in its unlocking position with the shoulder portion, whereby the rotatable locking plate may be moved into its unlocking position and means on the locking plate coacting with the latch for freeing the shoulder portion of the locking plate from the latch to permit the latch to engage another shoulder on the locking plate for limiting the outward movement of the locking plate, as described.

6. A pin locking plate for the purpose described having a recessed portion and a plurality of shouldered portions and an upwardly extending finger-like member attached thereto.

7. A latch for the purpose described having two shoulder portions and a fingered portion located between the shoulder portions, a spring attached to the latch for forcing it forward and a spring attached to the latch for moving it upwardly.

MOSES LA LONDE.